United States Patent
Singh et al.

(10) Patent No.: US 8,102,854 B2
(45) Date of Patent: Jan. 24, 2012

(54) NEIGHBOR DISCOVERY PROXY WITH DISTRIBUTED PACKET INSPECTION SCHEME

(75) Inventors: Hemant Singh, Westford, MA (US);
William Beebee, Acton, MA (US);
Madhu Sudan, San Jose, CA (US);
Joshua Littlefield, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/192,935

(22) Filed: Aug. 15, 2008

(65) Prior Publication Data

US 2008/0298277 A1 Dec. 4, 2008

Related U.S. Application Data (63) Continuation-in-part of application No. 11/026,641, filed on Dec. 30, 2004, now Pat. No. 7,646,786.

(60) Provisional application No. 60/574,506, filed on May 25, 2004, provisional application No. 60/574,876, filed on May 26, 2004, provisional application No. 60/582,732, filed on Jun. 22, 2004, provisional application No. 60/588,635, filed on Jul. 16, 2004, provisional application No. 60/590,509, filed on Jul. 23, 2004.

(51) Int. Cl.
*H04L 12/56* (2006.01)
(52) U.S. Cl. ........................................ 370/392
(58) Field of Classification Search .................. None
See application file for complete search history.

(56) References Cited

U.S. PATENT DOCUMENTS

| | | | |
|---|---|---|---|
| 4,977,593 A | 12/1990 | Balance |
| 5,153,763 A | 10/1992 | Pidgeon |
| 5,457,678 A | 10/1995 | Goeldner |
| 5,604,735 A | 2/1997 | Levinson et al. |
| 5,724,510 A | 3/1998 | Arndt et al. |
| 5,784,597 A | 7/1998 | Chiu et al. |
| 5,805,602 A | 9/1998 | Cloutier et al. |
| 5,918,019 A | 6/1999 | Valencia |
| 5,931,954 A | 8/1999 | Hoshina et al. |
| 5,933,420 A | 8/1999 | Jaszewski et al. |
| 5,963,557 A | 10/1999 | Eng |
| 6,023,769 A | 2/2000 | Gonzalez |
| 6,078,595 A | 6/2000 | Jones et al. |
| 6,101,180 A | 8/2000 | Donahue et al. |

(Continued)

FOREIGN PATENT DOCUMENTS

WO 0072509 11/2000

(Continued)

OTHER PUBLICATIONS

Postel, J., "User Datagram Protocol", RFC 768, Aug. 28, 1980, 3 pgs.

(Continued)

*Primary Examiner* — Yong Zhou
(74) *Attorney, Agent, or Firm* — Stolowitz Ford Cowger LLP (57) ABSTRACT

A network device is to receive traffic including neighbor discovery messages from requesting customer devices, and can detect the neighbor discovery messages within the traffic according to a distributed inspection scheme that includes the network device and a remote component. The network device is to then examine the neighbor discovery messages to determine if the neighbor discovery message should be forwarded to other of the customer devices, and respond to the requesting customer devices.

18 Claims, 5 Drawing Sheets

U.S. PATENT DOCUMENTS

| | | | |
|---|---|---|---|
| 6,137,793 | A | 10/2000 | Gorman et al. |
| 6,233,235 | B1 | 5/2001 | Burke et al. |
| 6,233,246 | B1 | 5/2001 | Hareski et al. |
| 6,275,990 | B1 | 8/2001 | Dapper et al. |
| 6,331,987 | B1 * | 12/2001 | Beser .................. 370/486 |
| 6,381,214 | B1 | 4/2002 | Prasad |
| 6,418,324 | B1 | 7/2002 | Doviak et al. |
| 6,434,141 | B1 | 8/2002 | Oz et al. |
| 6,438,123 | B1 | 8/2002 | Chapman |
| 6,490,727 | B1 | 12/2002 | Nazarathy et al. |
| 6,510,162 | B1 | 1/2003 | Fijolek et al. |
| 6,516,345 | B1 | 2/2003 | Kracht |
| 6,546,017 | B1 | 4/2003 | Khaunte |
| 6,556,591 | B2 | 4/2003 | Bernath et al. |
| 6,640,248 | B1 | 10/2003 | Jorgensen |
| 6,693,878 | B1 | 2/2004 | Daruwalla et al. |
| 6,697,970 | B1 | 2/2004 | Chisholm |
| 6,698,022 | B1 | 2/2004 | Wu |
| 6,751,230 | B1 | 6/2004 | Vogel et al. |
| 6,763,019 | B2 | 7/2004 | Mehta et al. |
| 6,763,032 | B1 | 7/2004 | Rabenko et al. |
| 6,771,606 | B1 | 8/2004 | Kuan |
| 6,804,251 | B1 | 10/2004 | Limb et al. |
| 6,807,193 | B1 | 10/2004 | Beser |
| 6,819,682 | B1 | 11/2004 | Rabenko et al. |
| 6,829,250 | B2 * | 12/2004 | Voit et al. .................. 370/467 |
| 6,847,635 | B1 | 1/2005 | Beser |
| 6,853,680 | B1 | 2/2005 | Nikolich |
| 6,857,132 | B1 | 2/2005 | Rakib et al. |
| 6,901,079 | B1 | 5/2005 | Phadnis et al. |
| 6,930,988 | B2 * | 8/2005 | Koodli et al. .................. 370/331 |
| 6,950,399 | B1 | 9/2005 | Bushmitch et al. |
| 6,959,042 | B1 | 10/2005 | Liu et al. |
| 6,986,157 | B1 | 1/2006 | Fijolek et al. |
| 6,993,016 | B1 | 1/2006 | Liva et al. |
| 6,993,353 | B2 | 1/2006 | Desai et al. |
| 6,996,129 | B2 | 2/2006 | Krause et al. |
| 7,006,500 | B1 | 2/2006 | Pedersen et al. |
| 7,007,296 | B2 | 2/2006 | Rakib et al. |
| 7,023,871 | B2 | 4/2006 | Lind et al. |
| 7,023,882 | B2 | 4/2006 | Woodward, Jr. et al. |
| 7,039,049 | B1 | 5/2006 | Akgun et al. |
| 7,050,419 | B2 | 5/2006 | Azenkot et al. |
| 7,065,779 | B1 | 6/2006 | Crocker et al. |
| 7,067,734 | B2 | 6/2006 | Abe et al. |
| 7,110,398 | B2 | 9/2006 | Grand et al. |
| 7,113,484 | B1 | 9/2006 | Chapman et al. |
| 7,116,643 | B2 | 10/2006 | Huang et al. |
| 7,117,526 | B1 | 10/2006 | Short |
| 7,139,923 | B1 | 11/2006 | Chapman et al. |
| 7,145,887 | B1 | 12/2006 | Akgun |
| 7,149,223 | B2 | 12/2006 | Liva et al. |
| 7,161,945 | B1 | 1/2007 | Cummings |
| 7,164,690 | B2 | 1/2007 | Limb et al. |
| 7,197,052 | B1 | 3/2007 | Crocker |
| 7,206,321 | B1 | 4/2007 | Bansal et al. |
| 7,209,442 | B1 | 4/2007 | Chapman |
| 7,269,159 | B1 | 9/2007 | Lai |
| 7,290,046 | B1 | 10/2007 | Kumar |
| 7,359,332 | B2 | 4/2008 | Kolze et al. |
| 7,363,629 | B2 | 4/2008 | Springer et al. |
| 7,467,227 | B1 | 12/2008 | Nguyen et al. |
| 7,490,345 | B2 | 2/2009 | Rakib et al. |
| 7,492,763 | B1 * | 2/2009 | Alexander, Jr. .................. 370/389 |
| 7,548,558 | B2 | 6/2009 | Rakib et al. |
| 7,613,209 | B1 | 11/2009 | Nguyen et al. |
| 7,646,786 | B2 | 1/2010 | Droms et al. |
| 2001/0010096 | A1 | 7/2001 | Horton et al. |
| 2001/0055319 | A1 | 12/2001 | Quigley et al. |
| 2001/0055469 | A1 | 12/2001 | Shida et al. |
| 2002/0009974 | A1 | 1/2002 | Kuwahara et al. |
| 2002/0010750 | A1 | 1/2002 | Baretzki |
| 2002/0023174 | A1 | 2/2002 | Garrett et al. |
| 2002/0052927 | A1 | 5/2002 | Park |
| 2002/0062450 | A1 * | 5/2002 | Carlson et al. .................. 713/200 |
| 2002/0067721 | A1 | 6/2002 | Kye |
| 2002/0073432 | A1 | 6/2002 | Kolze |
| 2002/0073433 | A1 | 6/2002 | Furuta et al. |
| 2002/0088003 | A1 | 7/2002 | Salee |
| 2002/0093935 | A1 | 7/2002 | Denney et al. |
| 2002/0093955 | A1 | 7/2002 | Grand et al. |
| 2002/0097733 | A1 | 7/2002 | Yamamoto |
| 2002/0131403 | A1 | 9/2002 | Desai et al. |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |
| 2002/0144284 | A1 | 10/2002 | Burroughs et al. |
| 2002/0146010 | A1 | 10/2002 | Shenoi et al. |
| 2002/0147978 | A1 | 10/2002 | Dolgonos et al. |
| 2002/0154655 | A1 | 10/2002 | Gummalla et al. |
| 2002/0161924 | A1 | 10/2002 | Perrin et al. |
| 2002/0198967 | A1 | 12/2002 | Iwanojko et al. |
| 2003/0014762 | A1 | 1/2003 | Conover et al. |
| 2003/0026230 | A1 * | 2/2003 | Ibanez et al. .................. 370/338 |
| 2003/0043802 | A1 | 3/2003 | Yazaki et al. |
| 2003/0058794 | A1 | 3/2003 | Pantelias et al. |
| 2003/0061415 | A1 | 3/2003 | Horton et al. |
| 2003/0066087 | A1 | 4/2003 | Sawyer et al. |
| 2003/0067944 | A1 | 4/2003 | Sala et al. |
| 2003/0101463 | A1 | 5/2003 | Greene et al. |
| 2003/0140131 | A1 | 7/2003 | Chandrashekhar et al. |
| 2003/0163341 | A1 | 8/2003 | Banerjee et al. |
| 2003/0214943 | A1 | 11/2003 | Engstrom et al. |
| 2003/0214982 | A1 | 11/2003 | Lorek et al. |
| 2004/0039466 | A1 | 2/2004 | Lilly et al. |
| 2004/0045037 | A1 | 3/2004 | Cummings et al. |
| 2004/0071148 | A1 * | 4/2004 | Ozaki et al. .................. 370/401 |
| 2004/0073902 | A1 | 4/2004 | Kao et al. |
| 2004/0101077 | A1 | 5/2004 | Miller et al. |
| 2004/0105403 | A1 | 6/2004 | Lin et al. |
| 2004/0105406 | A1 | 6/2004 | Kayama et al. |
| 2004/0143593 | A1 | 7/2004 | Le Maut et al. |
| 2004/0160945 | A1 | 8/2004 | Dong et al. |
| 2004/0163129 | A1 | 8/2004 | Chapman et al. |
| 2004/0181800 | A1 | 9/2004 | Rakib et al. |
| 2004/0244043 | A1 | 12/2004 | Lind et al. |
| 2004/0248530 | A1 | 12/2004 | Rakib et al. |
| 2005/0010958 | A1 | 1/2005 | Rakib et al. |
| 2005/0018697 | A1 | 1/2005 | Enns et al. |
| 2005/0078699 | A1 | 4/2005 | Cummings |
| 2005/0122976 | A1 | 6/2005 | Poli et al. |
| 2005/0138669 | A1 | 6/2005 | Baran |
| 2005/0198684 | A1 | 9/2005 | Stone et al. |
| 2005/0201399 | A1 | 9/2005 | Woodward, Jr. et al. |
| 2005/0220126 | A1 | 10/2005 | Gervais et al. |
| 2005/0226257 | A1 | 10/2005 | Mirzabegian et al. |
| 2005/0232294 | A1 | 10/2005 | Quigley et al. |
| 2005/0259645 | A1 | 11/2005 | Chen et al. |
| 2005/0265261 | A1 | 12/2005 | Droms et al. |
| 2005/0265309 | A1 | 12/2005 | Parandekar |
| 2005/0265338 | A1 | 12/2005 | Chapman et al. |
| 2005/0265376 | A1 | 12/2005 | Chapman et al. |
| 2005/0265392 | A1 | 12/2005 | Chapman et al. |
| 2005/0265394 | A1 | 12/2005 | Chapman et al. |
| 2005/0265397 | A1 | 12/2005 | Chapman et al. |
| 2005/0265398 | A1 | 12/2005 | Chapman et al. |
| 2005/0289623 | A1 | 12/2005 | Midani et al. |
| 2006/0002294 | A1 | 1/2006 | Chapman et al. |
| 2006/0098669 | A1 | 5/2006 | Enns et al. |
| 2006/0126660 | A1 | 6/2006 | Denney et al. |
| 2006/0159100 | A1 | 7/2006 | Droms et al. |
| 2006/0168612 | A1 | 7/2006 | Chapman et al. |
| 2007/0274345 | A1 | 11/2007 | Taylor et al. |
| 2008/0037545 | A1 | 2/2008 | Lansing et al. |

FOREIGN PATENT DOCUMENTS

| | | |
|---|---|---|
| WO | 0242882 | 5/2002 |
| WO | 2004006503 | 1/2004 |
| WO | 2005117310 | 12/2005 |
| WO | 2005117358 | 12/2005 |

OTHER PUBLICATIONS

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Module CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emergin Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Adoba, et al., Extensible Authentication Protocol (EAP), RFC 3748, Jun. 2004, pp. 1-64, Network Working Group.
ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.

Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Chapman, John T., "CMTS Remove PHY for a DOCSIS Network: DMPI Over IP Protocol Specification", RP-SP-DoIP-D1-040715B.doc, Cisco Systems, Inc., EDCS-387722, May 26, 2004.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.
Cable Television Laboratories, Inc., "DOCSIS® Set-top Gateway (DSG) Interface Specification" CM-SP-DSG-I02-040804, Copyright 2001-2004.
Cable Television Laboratories, Inc., "Data-Over-Cable Service Interface Specifications Modular CMTS", CM-SP-DEPI-W03-050302, 49 pgs., Copyright 2005.
Adoba, et al. Extensible Authentication Protocol (EAP), RFC 3748, Jun. 2004, pp. 1-64, Standards Track.
ITU-T Telecommunications Standardization Sector of ITU, Series J: Cable Networks And Transmission of Television, Sound Programme and other Multimedia Signals, Interactive Systems for Digital Television Distribution, Recommendation J. 122, Dec. 2002, 506 pages, International Telecommunications Union.
Cable Television Laboratories, Inc., "DOCSIS Radio Frequency Interfaces Specification", CM-SP-RFIv2.0-I10-051209, 538 pgs., Dec. 9, 2005.
Data Over Cable Service Interface Specification, Aug 4, 1997.
Ethereal: Display Filter Reference: DOCSIS Upstream Channel Descriptor, Webarchivedate Apr. 27, 2004.
DOCSIS Set Top Gateway (DSG) interface specification, Feb 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
Fellows et al., "DOCSIS Cable Modem Technology", IEEE Communication Magazine, vol. 39, Issue 3, Mar. 2001, pp. 202-209.
European Patent Office; "Supplementary European Search Report" for European Application No. EP05753969; Mar. 8, 2011; 6 pgs.
Desai, et al., FastChannel: A Higher-Speed Cable Data Service, AT&T Labs-Research, pp. 1-13, Jan. 2002.

* cited by examiner

NEIGHBOR DISCOVERY PROXY WITH DISTRIBUTED PACKET INSPECTION SCHEME

This application is a continuation-in-part of U.S. application Ser. No. 11/026,641, filed on Dec. 30, 2004, which claims the benefit of U.S. Provisional Application Nos. 60/574,506 filed May 25, 2004; 60/574,876 filed May 26, 2004; 60/582,732 filed Jun. 22, 2004; 60/588,635 filed Jul. 16, 2004; and 60/590,509 filed Jul. 23, 2004, and which is herein incorporated by reference in its entirety.

TECHNICAL FIELD

The present disclosure relates generally to the field of networking.

BACKGROUND

Neighbor Discovery (ND) is a protocol currently being deployed in the Internet Protocol (IP) version 6, abbreviated here as IPv6. It is possible that subsequent versions of IP as well as other communications protocols may use similar protocols, all of which will be referred to here as neighbor discovery. The Neighbor Discovery protocol is specified in the Internet Engineering Task Force (IETF) Request for Comments (RFC) 2462 and RFC 4862, and concepts disclosed here, while discussed with regard to IPv6, may be applicable to other protocols.

Hosts, routers and other network devices using IPv6 use the Neighbor Discovery protocol messages for several purposes. A host may use neighbor discovery to identify the hardware address associated with an IP address, and perform duplicate address detection (DAD) when employing stateless address autoconfiguration per RFC 2462 or RFC 4862. A host may use neighbor discovery to locate a network device such as a router. The network device will forward datagrams for the host. A network device such as a router may use neighbor discovery to identify itself to hosts on a link, and announce prefixes available on a link for hosts employing stateless address autoconfiguration. Datagrams, as that term is used here, are the 'bundles' of data employed to transmit data across the network, such as IP packets, Asynchronous Transfer Mode (ATM) cells, and Frame Relay (FR) frames.

Neighbor discovery messages are transmitted on a regular basis by both hosts and network devices. The neighbor discovery traffic on a link increases as the number of hosts on the link increases, and can represent a significant fraction of the total traffic on a link. Neighbor discovery messages are often sent to a multicast address, so that those messages are delivered to all of the hosts on a link and are individually processed by each host on a link.

When IPv6 is deployed by a service provider to customers over a cable medium, the network is often constructed so all of the "customer devices", or hosts, are connected to a single "network device", which forwards datagrams sent from customer devices. For example, customer premises equipment (CPE) devices (customer devices) are attached to the same cable modem termination system CMTS device (network device). The customer devices may be either cable modems (CMs) or home computers (PCs).

The upstream and downstream connectivity between the network device and the customer devices is asymmetric. In the downstream direction, from network device to customer device, the physical link is shared by all the customer devices. Hence they appear to be connected to the same link.

In the upstream direction, i.e., customer device to network device, the link is not shared; each device has its own unidirectional physical link to the network device. Hence, data sent by one device is not visible to the other devices. There are sometimes as many as 50,000 customer devices connected to a single network device. All of these devices generate neighbor discovery messages which are sent to various multicast addresses on the link, generating significant overhead on the link and causing significant processing overhead on the other customer devices receiving the neighbor discovery messages. The disclosure that follows solves this and other problems.

DESCRIPTION OF EXAMPLE EMBODIMENTS

Overview

In one example, a network device has a communications link to communicate with customer devices. The network device is to receive neighbor discovery messages from requesting customer devices, examine the neighbor discovery messages to determine if the neighbor discovery message should be forwarded to other of the customer devices, and respond to the requesting customer devices.

The network device can distinguish the neighbor discovery messages from other received traffic according to a distributed inspection scheme that includes the network device and a remote component. The distributed inspection scheme can include a pre-negotiated bit value added by the remote component according to packet inspection by the remote component. The presence of the pre-negotiated bit value enables the network device to detect the neighbor discovery messages using a fast inspection.

Description

Several preferred examples of the present application will now be described with reference to the accompanying drawings. Various other examples of the invention are also possible and practical. This application may be exemplified in many different forms and should not be construed as being limited to the examples set forth herein.

Figure 1:
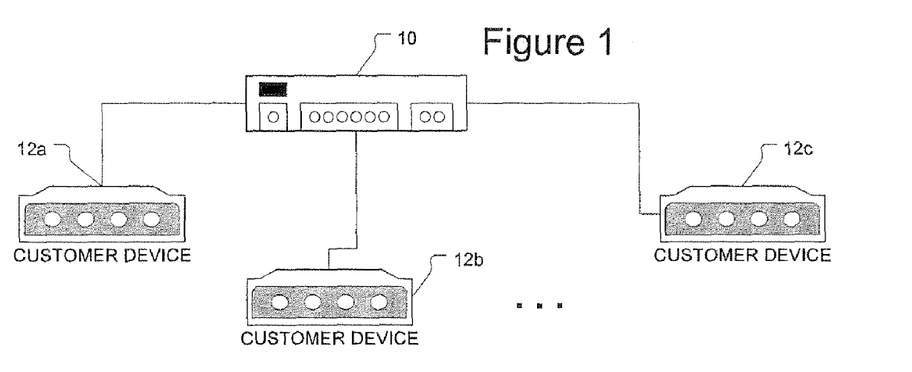
FIG. 1 illustrates an example network device to filter neighbor discovery communications received from several customer devices.

FIG. 1 illustrates an example network device to filter neighbor discovery communications received from several customer devices.

The network device 10 serves as a connection between the customer devices 12a-12c and the network. The customer devices may be cable modems or home computers (PCs). As many as fifty thousand customer devices can be connected to a single network device.

As discussed previously, in a cable modem network deploying IPv6 with neighbor discovery, or similar discovery protocols, the messages will generate significant overhead on the link, and significant processing overhead on the customer and network devices. For example, when the customer device 12*a* initializes it sends a neighbor discovery message across its connection to the network device 10 to perform duplicate address detection (DAD). The DAD process allows a device to determine if its chosen address is duplicated in the system. If it is duplicated, there are mechanisms in the DAD process to allow for selection of a unique address. Currently, the network device relays this message to any other customer devices that are currently connected to the network device, such as cable modems 12*b* through 12*c*. Each customer device receives a copy of the message from the customer device 12*a*.

Similarly, a customer device may need to identify the Media Access Control (MAC) address associated with a network address. Generally, this occurs when a customer device such as 12*a* is sending a packet to the network address of another device such as 12*c*. The customer device 12*a* sends a neighbor discovery message to determine the MAC address of the device that is associated with that network address. This message currently gets relayed by the network device to all of the customer devices.

One possible solution would be to filter out the messages for other devices at each customer device. All of these messages require some level of processing by each customer device, contributing to the inefficiencies of the network. Filtering the messages at the device interface on the customer device would alleviate part of this problem. However, it is not possible to do this in cable modem networks.

In embodiments of this invention, the network device uses filtering and proxying to reduce the link traffic and processing overhead in a cable network. The network device receives all of the messages from the customer devices prior to relaying them out to the other customer devices. By altering the operation of the network device, it is possible to avoid sending out a bulk of the neighbor discovery messages to other customer devices.

Figure 2:
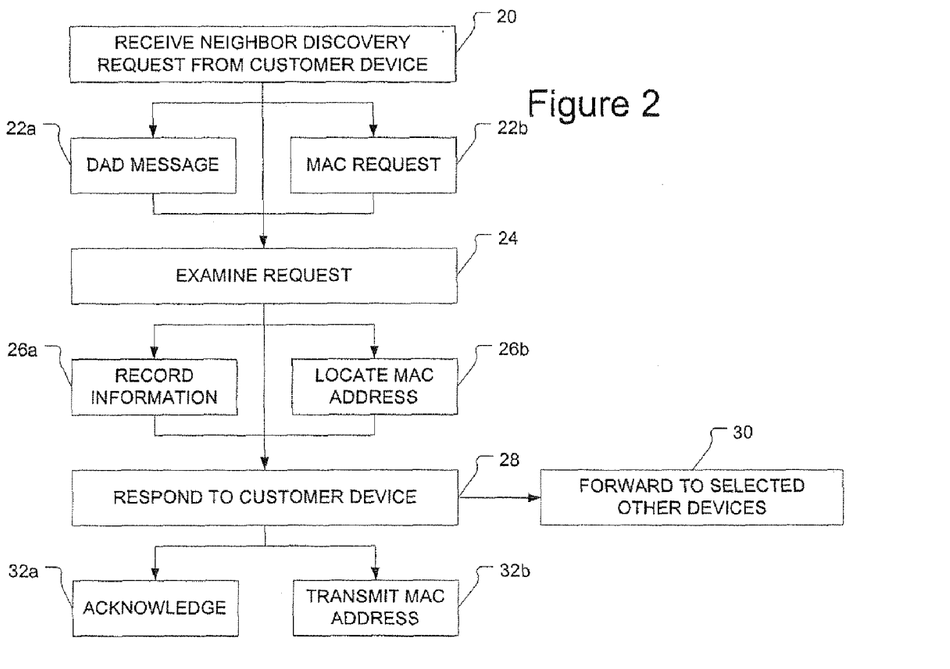
FIG. 2 illustrates an example flowchart for processing neighbor discovery messages using the example network device shown in FIG. 1.

FIG. 2 illustrates an example flowchart for processing neighbor discovery messages using the example network device shown in FIG. 1.

At 20, the network device receives a neighbor discovery request from the customer device. Essentially, the network device intercepts the message. These messages may be DAD messages 22*a*, MAC address requests 22*b*, or other types of messages, such as multicast messages. These specific examples will be addressed at each part of the process to demonstrate principles of the invention.

At 24, the message is examined. The network device 'reads' the message and determines the appropriate action needed in response. For example, when the message is a DAD message from a customer device 12*a* performing initialization, the network device would intercept the message and examine it at 24. If the message is a DAD message, at 26*a*, the network device examines its list of customer device information. If the network address does not already appear in the list, the network device forwards the request to select other devices in 30.

If there is no response, the network device adds the network address, such as an IPv6 address and MAC address for the customer device to its list of customer device information. If the address does appear in the list of customer device information, or some other device responds to DAD request forwarded by the network device, the network device then responds to the customer device at 28, in this example by sending an acknowledgement of the address at 32*a*. This process is repeated for each device as it initializes, adding its information to the list and responding directly to the device, rather than sending them out to all of the other customer devices.

For the example of the message being a MAC address request 26*b*, a similar process occurs. The network device intercepts the neighbor discovery from the requesting customer device. It then accesses its list of customer device information to determine the MAC address associated with a particular network address. If the address in the request appears in the list, the network device sends a response to the requesting CPE at 28 and does not forward the message to any of the other customer devices. In this example, the response includes the requested MAC address at 32*b*. If the address in the request does not appear in the list of customer device information, the network device forwards the request to other devices in 30. Any responses from other devices are returned to the customer device that sent the original request in 32*b*.

In some instances, there may be a need to send the neighbor discovery request to other devices. In those cases, the network device would intercept the message and determine which, if any, other customer devices need to receive the message. The neighbor discovery message would only be sent to relevant customer devices at 30, not to all devices connected to the network device, as currently happens.

Figure 3:
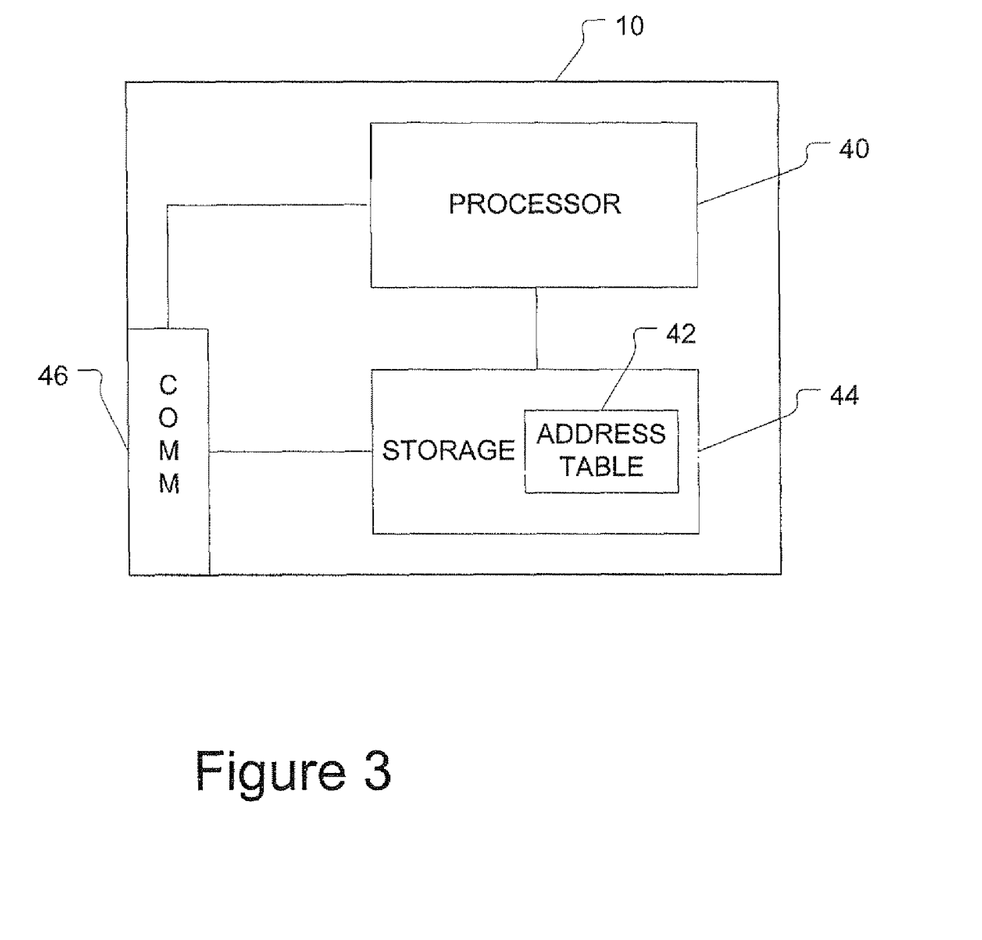
FIG. 3 illustrates components of the example network device shown in FIG. 1.

FIG. 3 illustrates components of the network device shown in FIG. 1.

The device has a communications link 46 to allow the device to communicate with customer devices. In a cable network, this communications link will generally be a cable link.

The device also has a processor 40 to receive neighbor discovery messages from requesting customer devices and to examine the neighbor discovery messages to determine if the neighbor discovery message should be forwarded to other of the customer devices. The processor also allows the device to respond to the requesting customer devices. The processor may be a general-purpose processor, a digital signal processor, etc., or any device that can process commands and perform the necessary operations of the network device.

In addition, the device may have a local storage 44 that contains the list of customer device information 42. This information may take the form of a table that lists the MAC address of devices associated with the devices network addresses. The storage may also be located elsewhere in the system.

Figure 4:
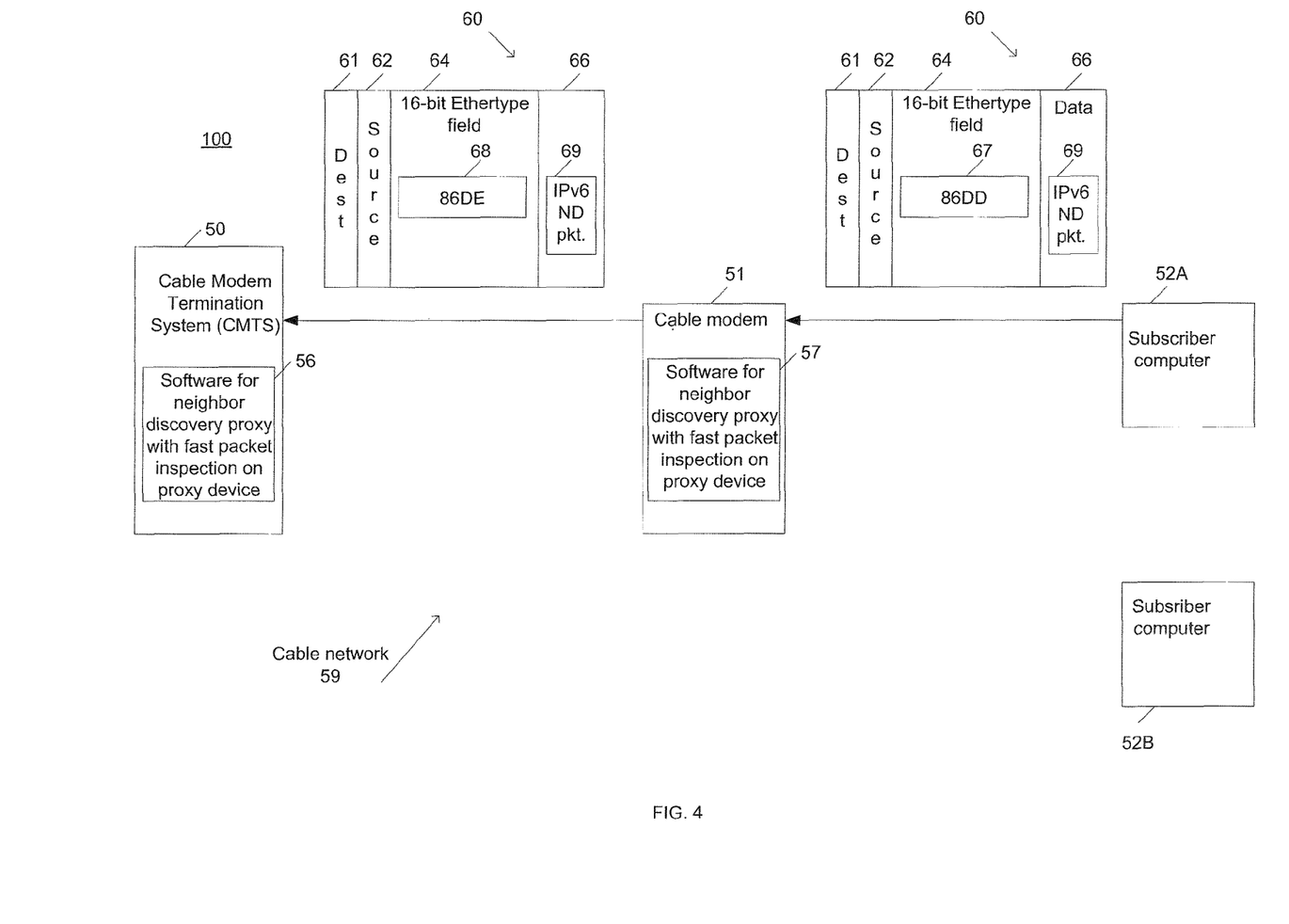
FIG. 4 illustrates a Cable Modem Termination System (CMTS) and a Cable Modem (CM) for neighbor discovery proxy with fast packet inspection on the CMTS.

FIG. 4 illustrates a Cable Modem Termination System (CMTS) and a Cable Modem (CM) for neighbor discovery proxy with fast packet inspection on the CMTS.

The example system 100 includes a CMTS 50 and a CM 51 configured with software 56 and 57, respectively, for neighbor discovery proxy with fast packet inspection on the proxy device. It should be apparent that the CMTS 50 is one example of the network device 10 shown in FIG. 1, and the CM 51 is one example of the customer devices 12A-C shown in FIG. 1.

Referring still to FIG. 4, as part of its proxy function, the CMTS 50 distinguishes the neighbor discovery messages from other traffic. Such distinguishing consumes some amount of a finite amount of available processing resources on the CMTS 50.

The amount of processing resources consumed by such distinguishing depends on the configuration of the neighbor discovery messages received by the CMTS 50. For example, if a received neighbor discovery message is sent via multicast, for example, the CMTS 50 can easily distinguish the neighbor discovery message from other traffic by observing the destination network address of received traffic. In other words, a relatively small amount of CMTS 50 resources are consumed by observing whether the destination network address contains a multicast address associated with neighbor discovery.

Conversely, if the neighbor discovery message is a conventional, unmodified unicast IPv6 transmission, the message cannot be as easily distinguished as a neighbor discovery message. Deep packet inspection can be used to identify these unicast IPv6 neighbor discovery messages. However, this deep packet inspection consumes a relatively large amount of processing resources for each inspection. When the processing resources per inspection are multiplied by the amount of packets routed by the CMTS 50, the CMTS 50 can be overloaded by the processing load of this deep packet inspection.

To address this and other problems, in the system 100 the CM 51 offloads a portion of packet inspection from the CMTS 50. Compared to the CMTS 50, which is an access router for many downstream devices and a gateway between the cable network 59 and another network such as the Internet, the CM 51 receives only a fraction of the traffic received by the CMTS 51. Accordingly, the processing burden for the CM 51 to perform packet inspection on received traffic to detect neighbor discovery messages is significantly less than the processing burden for the CMTS 50. Accordingly, in the system 100, a distributed scheme is used whereby the CM 51 performs packet inspection on upstream traffic to identify neighbor discovery messages sent upstream to the CMTS 50 to offload that burden from the CMTS 50.

The concept described above can best be described by way of an example. When the subscriber computer 52A unicasts a neighbor discovery message 60 using IPv6 to another computer 52B (which may be behind a different cable modem) for the purposes of Neighbor Unreachability Dedection (NUD), the message 60 is received by the CM 51 for modulation before transferring onto the modulated portion of the cable network 59. It should be understood that the message 60 is wrapped in a layer two wrapper, such as an Ethernet frame having fields 61, 62, 64, and 66. The IPv6 packet 69 representing the address request is encapsulated therein. It should be understood that the illustrated Ethernet frame is only one example of a layer two wrapper, in other examples, the message 60 may be wrapped in a different type of layer two wrapper, such as a Point-to-Point Protocol (PPP) wrapper.

As stated previously, the software 57 of the CM 51 performs packet inspection on IPv6 packets in the upstream direction to identify the message 60 as a neighbor discovery message. Specifically, the software 57 analyzes more deeply than the layer two wrapper to inspect the IPv6 packet 69 itself (the network layer in this example). Through this inspection, the software 57 observes that the message 60 is a neighbor discovery message. It should be understood that the software 57 can perform an initial inspection to detect IPv6 packets, and then perform a deeper packet inspection only on the detected IPv6 packets to determine whether they are neighbor discovery messages or some other IPv6 packet.

Responsive to this detection, the software 57 makes a pre-negotiated change to a lower layer portion of the message 60. This change is pre-negotiated with the CMTS 50 as a way to distinguish the message 60 as a neighbor discovery message at an outer layer of the message 60. The pre-negotiated change is preferably to a first layer of the packet that encapsulates a second deeper layer that was analyzed during the packet inspection.

In the present example, the pre-negotiated change is to the value 67 of the 16-bit Ethertype field 64. By way of background, the Ethernet standard defines different bit combinations to be included in this field to indicate what protocol was used to generate the data contained in the payload field 66. For example, the bit combination "86DD" is a universal value indicating that the payload 66 contains an IPv6 packet. If a different type of packet were included in the payload 66, for example an IPv4 packet, a different bit value from the Ethernet standard would be included in the Ethertype field 64.

The software 57 replaces the Ethernet standard bit value "86DD" with a non-standard pre-negotiated value 68 before modulating and transferring the packet 60. The replacement bit value 68 can be any pre-negotiated value, such as "86DE". Preferably, the pre-negotiated value 68 is different than all other Ethernet standard values. Accordingly, it should be understood that the bit value 67 in the Ethertype field 64 is modified without modifying the data in the Ethernet payload field 66 immediately thereafter.

The software 56 on the CMTS 50 is configured to analyze the Ethertype field 64 of upstream traffic for the pre-negotiated value 68. It should be apparent that such analysis can be on the layer two wrapper of the packet (the physical layer), not deeper into the layer three information (the network layer), and accordingly consumes a relatively small amount of CMTS processing resources in comparison to the cable modem packet inspection. The software 56 distinguishes the message 60 as being a neighbor discovery message by observing the presence of the bit value "86DE" in the Ethertype field 66.

Thereafter, the CMTS 50 can perform a process similar to the process described with reference to FIG. 1. Namely, the CMTS 50 will determine whether the neighbor discovery message 60 is to be forwarded, or filtering with a response back to the subscriber computer 52A. Although the example neighbor discovery message 60 will be filtered, if a different neighbor discovery message with the value 68 is to be forwarded to the access network, as part of a link layer function the CMTS 50 will replace the layer two wrapper with a new layer two wrapper, which will contain the pre-negotiated bit value 68 within the cable network 59. Containment is useful because the pre-negotiated bit value 68 does not match with the actual protocol used to format the data contained in the payload 66, which has the potential to create errors on devices not configured with the software 56.

It should be apparent that inspection by the CMTS or other access router can operate differently for unicast messages versus non-unicast messages. For example, the CMTS can use a non-distributed inspection scheme to identify neighbor discovery messages addressed to multicast addresses, and still use the distributed inspection scheme to identify unicast neighbor discovery messages. In such a system, the cable modem can perform this packet inspection only on unicast messages.

It should be apparent that inspection by the CMTS or other access router can operate differently for IPv6 messages than IPv4 messages. For example, the CMTS can use a non-distributed inspection scheme to identify IPv4 neighbor discovery messages, and still use the distributed inspection scheme to identify IPv6 neighbor discovery messages. The cable modem can avoid this packet inspection on many packets by initially determining whether the packet is an IPv6 packet, and if not, circumvent this packet inspection. Similarly, the CMTS can circumvent its portion of the distributed inspection process for IPv4 packets and other non-IPv6 packets.

It should be apparent that the principles described above are applicable to cable networks having either an Integrated CMTS (I-CMTS) or a Modular CMTS (M-CMTS).

It should be apparent that the principles described are practical for other networks besides cable networks. For example, any type of access router and corresponding remote device can be used. If the modification by the remote device involves changing a standard Ethertype bit value to a non-standard Ethertype bit value, it is preferable to utilize a single point of access router such that the non-standard Ethertype bit values are contained within a network. The single point of access device can contain the non-standard values by link local addressing, filtering according to the non-standard Ethertype value, or hop count mechanisms. Containment by a hop count mechanisms works by providing the modified messages with a hop count value that, when decremented by the access router, will prevent the message from being forwarded.

Figure 5:
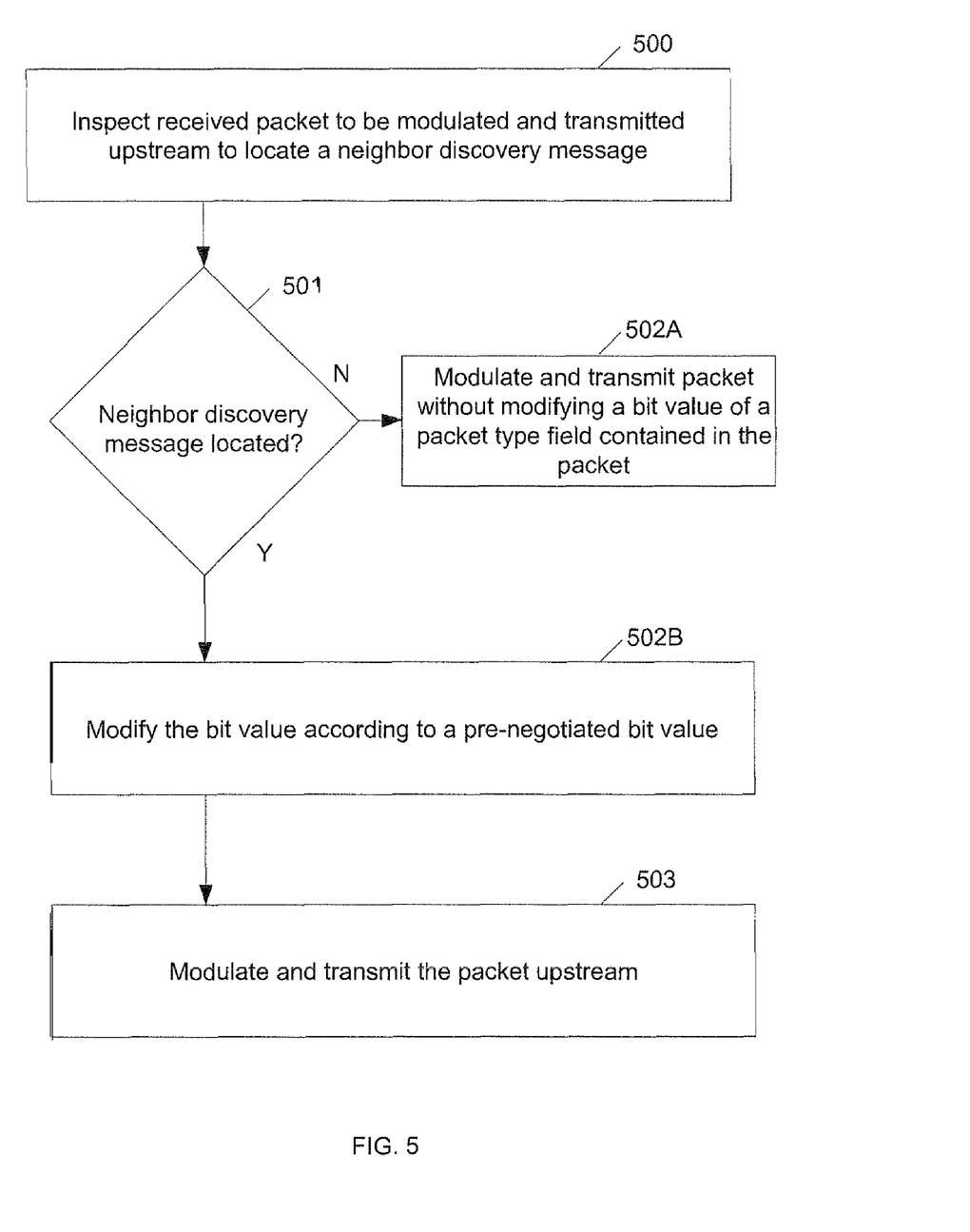
FIG. 5 illustrates how the CM shown in FIG. 4 processes neighbor discovery messages.

FIG. 5 illustrates how the CM shown in FIG. 4 processes neighbor discovery messages.

In block 500, the CM 51 inspects a received packet to be modulated and transmitted upstream to locate a neighbor discovery message. If the received packet is not a neighbor discovery message in decision block 501, in block 502A the CM 51 modulates and transmits the packet without modifying a bit value of a packet type field contained in the packet.

If a neighbor discovery message is located in decision block 501, in block 502B the CM 51 modifies the bit value according to a pre-negotiated bit value. It should be understood that the modified bit value is preferably located in a lower layer than the highest inspected layer. In other words, the inspection included a deeper wrapper than the wrapper containing the modified bit value. In block 503, the CM 51 modulates and transmits the packet upstream.

Figure 6:
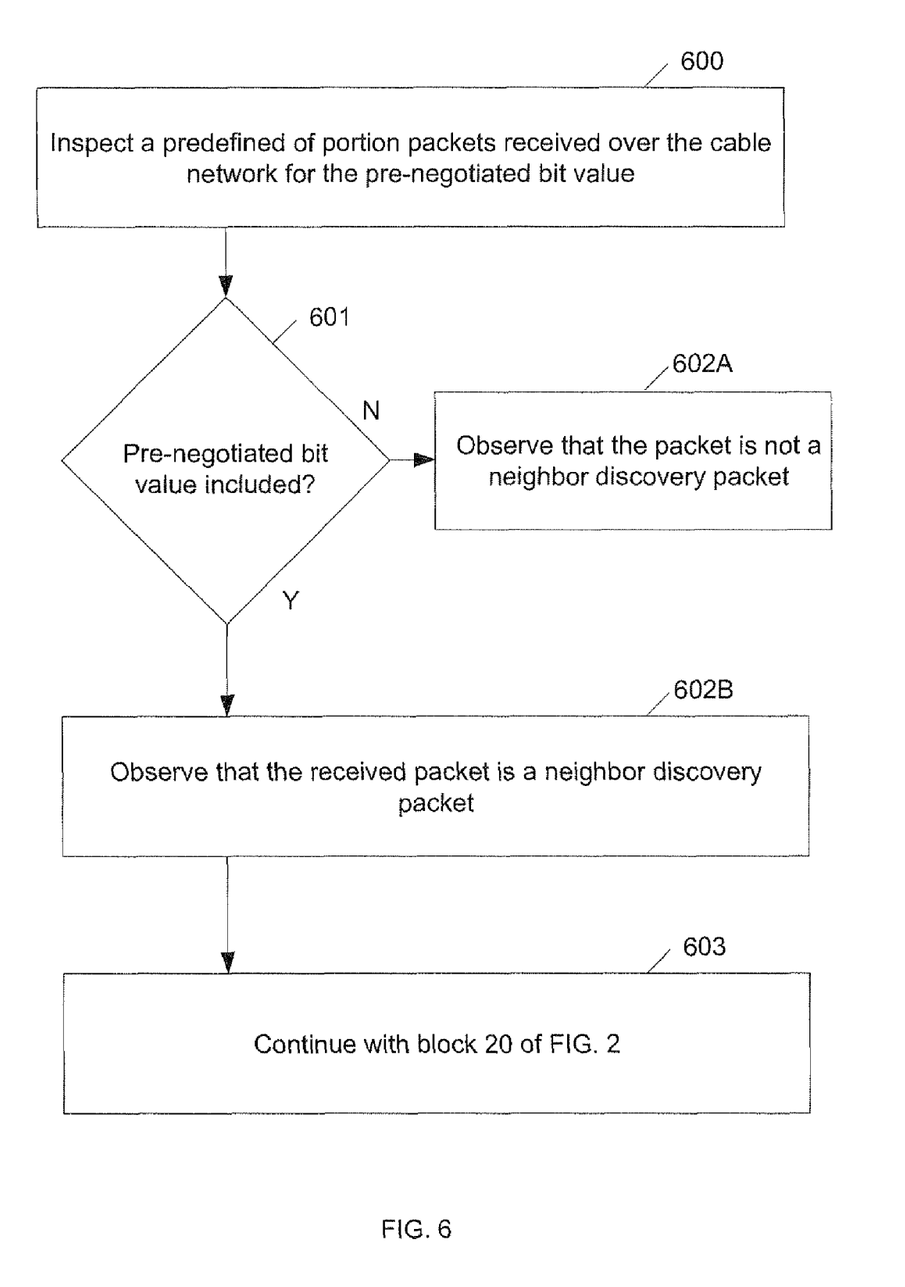
FIG. 6 illustrates how the CMTS shown in FIG. 4 processes neighbor discovery messages.

FIG. 6 illustrates how the CMTS shown in FIG. 4 processes neighbor discovery messages.

In block 600, the CMTS 50 inspects a predefined portion of packets received over the cable network for the pre-negotiated bit value. If the pre-negotiated bit value is absent in decision block 601, in block 602A the CMTS 50 observes that the packet is not a neighbor discovery packet.

If the pre-negotiated bit value is included in decision block 601, in block 602B the CMTS 50 observes that the received packet is a neighbor discovery packet. In block 603 the CMTS 50 continues with block 20 of FIG. 2.

It should be understood that the principles described above are not limited to cable networks. For example, the principles described above can be applied to wireless IPv6 networks where an access router and other network devices operate according to a distributed packet inspection scheme.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system, comprising:
a processing device configured to:
receive a packet encapsulated with a plurality of protocol layers including at least a first IPv6 layer and a second Ethernet layer that encapsulates the first IPv6 layer, the second Ethernet layer of the received packet including an Ethertype field containing a standard bit value that denotes, according to the Ethernet protocol, an IPv6 packet in a payload of the Ethernet frame;
inspect the received packet to determine whether the received packet is a neighbor discovery message, wherein the first IPv6 layer of the protocol layers is analyzed during the inspection;
if the received packet is not a neighbor discovery message according to the inspection, then forward the packet with the standard bit value in the Ethertype field;
if the received packet is a neighbor discovery message according to the inspection, then replace the standard bit value in the Ethertype field to a new non-standard bit value according to a distributed inspection scheme between the processing device and a remote device; and
forward the packet having the new non-standard bit value in the Ethertype field.

2. The system of claim 1, further comprising a routing device, wherein the routing device is configured to:
receive the forwarded packet; and
perform fast packet inspection on the forwarded packet to observe that the forwarded packet contains a neighbor discovery message, wherein said fast packet inspection checks for the non-standard bit value in the second Ethernet layer and consumes fewer processing resources than the inspection by the processing device.

3. The system of claim 2, wherein the routing device is configured to determine whether to filter the neighbor discovery message according to a destination of the neighbor discovery message.

4. The system of claim 1, wherein the inspection and replacing by the processing device offloads packet inspection from an access router.

5. The system of claim 4, wherein the processing device is a cable modem and the access router is a Cable Modem Termination System (CMTS), wherein the cable modem is configured to perform an initial inspection of the packet and the CMTS performs a fast subsequent inspection based on the initial packet inspection by the cable modem.

6. The system of claim 1, wherein the processing device performs the replacement prior to the processing device modulating the received packet for transmission on a cable network.

7. A system, comprising:
a network device configured to operate between a first network and a second network, the network device to communicate traffic sent from a plurality of subscriber devices of the second network to the first network, to receive traffic from the first network for forwarding over the second network to the subscriber devices, wherein the network device includes:
a database containing addressing information for the subscriber devices;
a communications link to allow the network device to communicate with the second network; and
a processor configured to:
for an upstream portion of the traffic that is received over the second network, inspect an Ethertype field of IPv6-based packets included in the upstream traffic portion, said inspection to distinguish ones of the IPv6-based packets that contain a negotiated first bit value in their respective Ethertype fields from those ones of the IPv6-based packets that contain a standard second bit value in their respective Ethertype fields; and
for only those ones of the IPv6-based packets that contain the negotiated first bit value in their respective Ethertype fields:
identify an address corresponding to the IPv6-based packet;
compare the identified address to the database to determine whether the database includes a stored address corresponding to the identified address;
forward the IPv6-based packet if the corresponding stored address is absent from the database; and
filter the IPv6-based packet according to the comparison if the corresponding stored address is present in the database, said filtering preventing the IPv6-based packet from being forwarded to a non-originating one of the subscriber devices.

8. The system of claim 7, wherein the processor is further configured to replace the negotiated first bit value with the standard second bit value in at least one of the IPv6-based packets before forwarding such IPv6-based packet.

9. The system of claim 8, wherein the negotiated first bit value is a non-standard Ethertype field value.

10. The system of claim 9, wherein the replacement ensures containment of the non-standard Ethertype field value within an upstream path of the second network.

11. A method, comprising:
inspecting, at a first device, a first IPv6 layer of a packet, the first IPv6 layer encapsulated in a second Ethernet layer;
if the inspection indicates that the packet is a neighbor discovery packet, then modifying original information contained in an Ethertype field of the second Ethernet layer of the packet to indicate a result of the inspection and forwarding the packet having the modified information in the Ethertype field from the first device, over a network, to a second device; and
if the inspection indicates that the packet is not a neighbor discovery packet, then forwarding the packet having the original information in the Ethertype field from the first device, over the network, to the second device;
wherein the original information in the Ethertype field includes a standard bit value for indicating that the packet contains an IPv6 packet in a payload of the Ethernet frame and the modified information does not contain the standard bit value.

12. The method of claim 11, further comprising:
identifying an address included in the packet;
comparing the identified address to a list containing addressing information for cable modems;
determining whether the list includes a stored address corresponding to the identified address according to the comparison; and
preventing the packet from being forwarded according to the determination such that the packet is not forwarded if the stored address is present in the list.

13. The method of claim 12, further comprising responding to a source of the packet if the packet is prevented from being forwarded.

14. The method of claim 11, further comprising:
subsequently inspecting the second Ethernet layer at the second device, the subsequent inspection to observe the modified information; and
responsive to the observation of the modified information, determining whether to forward the packet from the second device to an indicated destination.

15. The method of claim 14, wherein the subsequent inspection to observe the modified information analyzes a subset of data analyzed during the previous inspection.

16. The method of claim 11, wherein the modified information is contained within an Ethertype field of the packet.

17. A method, comprising:
receiving a packet encapsulated with a plurality of protocol layers including at least a first IPv6 layer and a second Ethertype layer that encapsulates the first IPv6 layer, the second Ethertype layer of the received packet including an Ethertype field containing a standard bit value that denotes, according to the Ethernet protocol, an IPv6 packet in a payload of the Ethernet frame;
inspecting the received packet to determine whether the received packet is a neighbor discovery message, wherein the first IPv6 layer of the plurality of protocol layers is analyzed during the inspection;
if the received packet is not a neighbor discovery message according to the inspection, then forwarding the packet with the standard bit value in the Ethertype field;
if the received packet is a neighbor discovery message according to the inspection, then replacing the standard bit value in the Ethertype field to a new non-standard bit value according to a network-distributed inspection scheme; and
forwarding the packet having the new non-standard bit value in the Ethertype field.

18. The method of claim 17, wherein the standard bit value is one of a plurality of Ethernet standard values and the new non-standard bit value is another value that is different than all of the plurality of Ethernet standard values.

* * * * *